Dec. 8, 1942. N. G. HAYES 2,304,167
GROUNDING AND SEALING DEVICE
Filed May 24, 1939
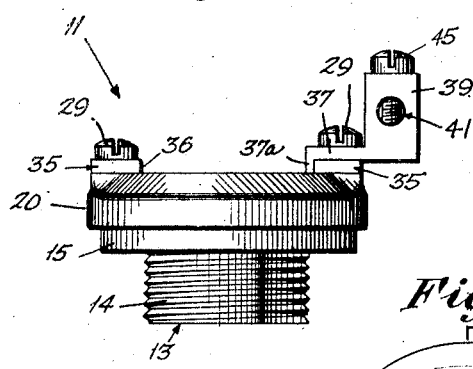
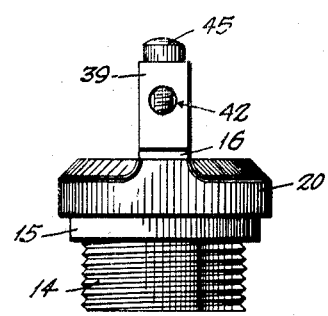
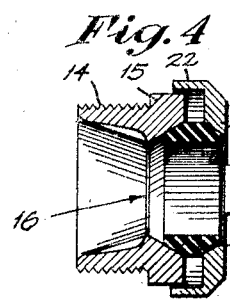
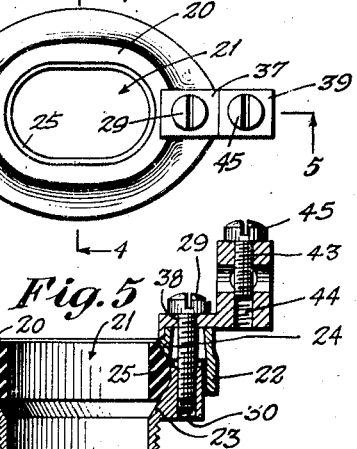
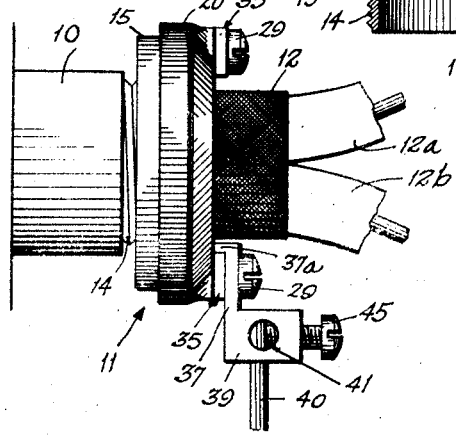
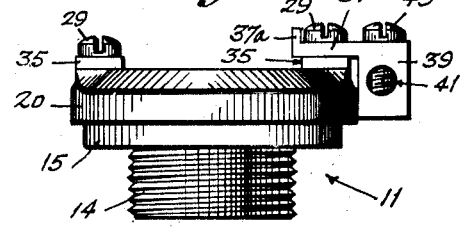
INVENTOR
*Neil G. Hayes*
BY
ATTORNEYS Patented Dec. 8, 1942

2,304,167

UNITED STATES PATENT OFFICE 2,304,167

GROUNDING AND SEALING DEVICE

Neil G. Hayes, Bridgeport, Conn.

Application May 24, 1939, Serial No. 275,443

5 Claims. (Cl. 174—78)

The present invention relates to a service fitting and a grounding means therefor.

When service wires are carried into a building, they are usually passed through a service fitting. When this is done, means must be provided for sealing the opening where the conductors pass through the service fitting. Inasmuch as the service fitting is exposed and the wires leading thereto are exposed and they may become damaged or charged with electric current, it is highly desirable to ground the service fitting before any damaging currents can pass into the house.

An object of the present invention is to provide a service fitting of the type which will securely seal the opening through which the wires leading into the house are passed.

A further object of the invention is to provide a novel means whereby the fitting can be grounded.

A feature of the invention resides in the novel ground connection which is clamped to the fitting by the draft means for the fitting itself, which ground connection cooperates with the fitting so that relative rotation therebetween is eliminated.

Other features and advantages of the invention will be apparent from the specification and claims when taken in connection with the drawing, in which:

Figure 1 shows a side elevation of the device.

Fig. 2 is an end view, looking from the right.

Fig. 3 is a top plan view.

Fig. 4 is a sectional view, taken along line 4—4 of Fig. 3.

Fig. 5 is a sectional view, taken along line 5—5 of Fig. 3.

Fig. 6 shows a service fitting in place with the ground wire secured thereto.

Fig. 7 shows a side elevation of the service fitting with the ground connector in inverted position.

As shown in the drawing, a conduit 10 or the like, which leads into a structure such as a house or the like, is provided with a service fitting 11 for receiving a cable or the like 12. In the preferred form of the invention, the service fitting is provided with a connecting member 13 having a threaded neck 14 to be threaded to the open end of the conduit 10 and is provided with a head 15. Inasmuch as the cable usually includes two conductors 12a, 12b placed side by side, the head is made oval and is provided with an oval opening 16 through which this cable can pass. It is to be understood that the head can be shaped as required.

As shown in Fig. 5, the service fitting is provided with a cap 20 which fits over the head and has an opening 21 corresponding to the opening in the head and a dependent flange 22 extending around and in close contact with the sides of the head of the connecting member.

The surface of the head around the opening is tapered, as shown at 23, and the surface of the cap is tapered as shown at 24, and a packing ring or member 25 of rubber or the like material is positioned between the head and cap and extends around the opening and has tapered surfaces 26, 27 cooperating with the tapered surface of the head and cap which operate to compress the packing into engagement with the cable in the opening when the cap is moved toward the head.

While the cap can be moved to compress the packing in many ways, in the preferred form of the invention it is accomplished by providing the cap with apertures 28 at each end and through which screws 29 are passed and threaded into threaded apertures 30 in the head to draw the cap toward the head when the screws are tightened.

Thus, after the cable has been passed through the fitting and into the conduit and is properly positioned therein, the screws are tightened so as to draw the cap toward the head of the connector and, through the cooperation of the tapered surfaces of the cap and head on the packing, cause the material of the packing to be forced into engagement with the cable and seal the opening against entry of moisture, dirt, or other foreign material into the conduit.

Inasmuch as the cable and the service fitting are exposed, it is desirable that the service fitting be grounded to prevent stray currents from passing into the electrical system to which the cables feed.

According to the present invention, a novel ground connector is provided which is connected to the service fitting by the draft means for clamping the cap to the head.

As shown in Figs. 1 and 3, the cap is provided with a projecting portion or lug 35 surrounding each of the apertures 28 therein at the ends thereof. These projecting lugs are provided with one or more flat walls or faces 36 and a flat top face which is adapted to form a support for the ground connector which comprises a plate 37 having an aperture 38 therein through which the screw can pass to lock it to the service fitting. One end of the plate 37 is provided with a depending flange 37a which engages the flat surface 36 of the lug to hold the ground connector against rotation.

The other end of the plate is provided with a post 39 projecting upwardly therefrom and to which a grounding wire 40 is connected. While the post may take any shape, in the preferred form of the invention it is square and has wire-receiving holes 41, 42 passing transversely from side to side for receiving the end of the grounding wire as shown in Fig. 6.

The top and bottom of the post have threaded apertures 43, 44 into which a clamping screw 45 can be threaded from either end to press the wire against the opposite threaded opening and wall of the wire-receiving hole to grip the wire between the end of the screw and the opening and wall to hold it securely in the connector.

It will be apparent that the ground connector can be positioned so as to project from the end of the fitting, as shown in Fig. 3, or can be mounted thereon so as to project to either side of the fitting with the depending flange cooperating with the flat sides of the lug to hold the ground connector against rotation with respect to the fitting.

If space is limited, the ground connector can be reversed, as shown in Fig. 7, with the post projecting down along the side of the service fitting. In this position, the depending flange will no longer cooperate with the projecting lug on the cap to hold the ground connector against rotation therewith. However, when the ground connector is so positioned, it will be held against rotation with respect to the service fitting by having the flat sides thereof engage the side of the fitting.

When it is desired to install the service fitting, the connector 13 is secured to the conduit, the packing ring 25 is positioned in engagement with the tapered surface 23 of the head, the cap is then placed over the head of the connector, and one or both of the screws 29 put in position to hold the parts in assembled relation without compressing the packing. The cable is then passed through the service fitting and properly positioned therein, and the service fitting is then ready to be sealed around the cable. Before this is done, however, the ground connector is positioned under the head of one of the screws so as to be secured to the ground device when the screws are tightened to cause the seal to be made around the cable.

It is to be noted with this novel ground connector the grounding wire can be secured to the connector before it is associated with the service fitting or after it has been located under the head of the screw and the two screws tightened to cause the sealing ring to be compressed into sealing engagement with the cable.

By providing the service fitting with lugs at each end, the ground connector can be attached at either end of the cap, and thus facilitates installation and grounding of the service fitting.

Variations and modifications may be made within the scope of this invention and portions of the improvements may be used without others.

I claim:

1. A service fitting for receiving a conductor including a connecting member, a cap therefor; a packing interposed between the cap and connecting member and surrounding the conductor; a connector for grounding the fitting; means for clamping the packing between said cap and connecting member to compress the same into sealing engagement with the conductor, said means securing said cap to said connecting member and clamping said grounding connector to said cap; and means on said grounding connector interlocking with means on said cap when clamped thereto for preventing relative rotation therebetween.

2. A service fitting including a connector and a cap therefor, said cap having a flat-sided projecting portion on the outer face thereof; a ground connector secured to said fitting and comprising a plate having at one end thereof a dependent flange for engaging one of the flat sides of the projecting portion, the engagement between said flange and one of the flat sides of the projecting portion holding the plate against rotation relative to said cap, an upstanding post carried by the other end of said plate, said post having transversely extending apertures in the sides thereof for receiving a grounding wire and threaded apertures at the top and bottom thereof, and a clamping screw threaded in one of the threaded apertures in the post and into clamping relation with a grounding wire; and common means for clamping the cap to said connector and the ground connector to said fitting with the flange of said ground connector in engagement with one of the flat sides of the projecting portion of said cap.

3. A service fitting for receiving a conductor comprising a cylindrical threaded neck having an oval head thereon; an oval conductor-receiving aperture formed in said head; a cap of similar shape positioned over said head and having an aperture corresponding in shape to the aperture of the head; a sealing ring disposed between the cap and the head adjacent the aperture, the outer face of said cap having a flat-sided projecting portion at the opposite sides thereof; a ground connector; means carried by said ground connector for engaging the flat sides of either projecting portion of the cap; and means for clamping the sealing ring between the cap and the head to compress the same into sealing engagement with the conductor, said means securing said cap to the head and clamping the ground connector to said cap with the means of the ground connector engaging the flat sides of one of said projecting portions, the engagement between said means and the flat sides of one of said projecting portions holding said ground connector against rotation relative to said cap.

4. A service fitting for receiving a conductor including a connecting member; a cap for said connecting member; a rubber seal interposed between the cap and connecting member and surrounding the conductor; a ground connector including a plate having a square post projecting from one end thereof, said post having a conductor-receiving aperture passing therethrough and a clamping screw threaded in the end of the post for locking wires passing through said conductor-receiving apertures to said post; said draft means for clamping the rubber seal between said cap and connecting member to compress the same into sealing engagement with the conductor, said means securing said cap to said connecting member and clamping the plate of said ground connector to said cap with a flat side of said post in engagement with the cap to hold said ground connector against rotation with respect to the service fitting.

5. A service fitting for receiving a conductor including a connecting member, a cap therefor; a packing interposed between the cap and connecting member and surrounding the conductor; a connector for grounding the fitting; means for clamping the packing between said cap and connecting member to compress the same into sealing engagement with the conductor, said means securing said cap to said connecting member and clamping said grounding connector to said cap; and means carried by said grounding connector engageable with means formed on said cap for holding said grounding connector against rotation relative to said cap when clamped thereto.

NEIL G. HAYES.